United States Patent [19]
Satou

[11] Patent Number: 5,583,529
[45] Date of Patent: Dec. 10, 1996

[54] PORTABLE APPARATUS HAVING A FLAT PANEL TYPE DISPLAY UNIT

[75] Inventor: Youji Satou, Tokyo, Japan

[73] Assignee: Kabushiki Kaisha Toshiba, Kawasaki, Japan

[21] Appl. No.: 402,566

[22] Filed: Mar. 13, 1995

Related U.S. Application Data

[63] Continuation of Ser. No. 173,951, Dec. 28, 1993, abandoned, which is a continuation of Ser. No. 993,918, Dec. 18, 1992, abandoned, which is a continuation of Ser. No. 577,535, Sep. 5, 1990, abandoned.

[30] Foreign Application Priority Data

Oct. 31, 1989 [JP] Japan .................................. 1-283724

[51] Int. Cl.$^6$ ............................................... G09G 5/00
[52] U.S. Cl. .................... 345/87; 361/681; 364/708.01; 345/905
[58] Field of Search ................................. 345/905, 156, 345/87; 364/708.01; 361/679, 681, 688, 690, 694, 736, 748, 760, 761

[56] References Cited

U.S. PATENT DOCUMENTS

| | | |
|---|---|---|
| D. 290,256 | 6/1987 | Sapper . |
| 4,388,672 | 6/1983 | Skill . |
| 4,427,997 | 1/1984 | Hareng et al. . |
| 4,438,458 | 3/1984 | Mänscher .................. 340/700 |
| 4,571,456 | 2/1986 | Paulsen et al. . |
| 4,680,674 | 7/1987 | Moore ....................... 345/156 |
| 4,725,694 | 2/1988 | Auer et al. ................. 340/712 |
| 4,736,332 | 4/1988 | Crease ....................... 340/712 |
| 4,749,364 | 6/1988 | Arney et al. . |
| 4,812,837 | 3/1989 | Shiraishi et al. ........... 340/784 |
| 4,859,911 | 8/1989 | Kinnard et al. . |
| 4,926,365 | 5/1990 | Hsieh ......................... 364/708 |
| 4,978,949 | 12/1990 | Herron et al. ............. 364/708 |
| 4,980,848 | 12/1990 | Griffin et al. ............. 364/708 |
| 5,001,468 | 3/1991 | Brice ......................... 340/700 |
| 5,021,922 | 6/1991 | Davis et al. ............... 364/708 |
| 5,113,360 | 5/1992 | Satou ......................... 364/708 |
| 5,122,927 | 6/1992 | Satou . |
| 5,130,892 | 7/1992 | Satou . |
| 5,138,565 | 8/1992 | Satou ......................... 364/708 |
| 5,166,893 | 11/1992 | Hosoi ......................... 364/708 |
| 5,193,069 | 3/1993 | Furuya ....................... 364/708 |

FOREIGN PATENT DOCUMENTS 2168309  9/1989  Japan .

OTHER PUBLICATIONS

European Search Report dated May 27, 1991.
IBM Technical Disclosure Bulletin, vol. 29, No. 10, pp. 4273–4274, Mar. 1987.

Primary Examiner—Richard Hjerpe
Assistant Examiner—Regina Liang
Attorney, Agent, or Firm—Finnegan, Henderson, Farabow, Garrett & Dunner L.L.P.

[57] ABSTRACT

A portable computer has a keyboard and a display unit mounted to a base unit. The base unit is equipped with a battery for generating a reference voltage. The display unit has a plasma display and a housing for containing the plasma display. This housing is rotated to an open position for permitting visual confirmation of plasma display at the time of display of an image. In the housing of the display unit is retained a voltage converter for converting the reference voltage of the battery into a drive voltage for driving the plasma display. The voltage converter, which self-generates heat during its converting operation, is arranged on the right or left sides of the plasma display rotated to the open position or above the plasma display.

15 Claims, 10 Drawing Sheets

PORTABLE APPARATUS HAVING A FLAT PANEL TYPE DISPLAY UNIT

This application is a continuation of application Ser. No. 08/173,951 filed Dec. 28, 1993 now abandoned; which is a continuation of application Ser. No. 07/993,918, filed Dec. 18, 1992, which is a continuation of application Ser. No. 07/577,535, filed Sep. 5, 1990, both now abandoned.

BACKGROUND OF THE INVENTION

1. Field of the Invention

The present invention relates to a portable apparatus, such as a laptop type or portable type computer having a flat panel type display unit mounted detachable to a base unit. More particularly, this invention relates to a structure of a display unit having a voltage converter built therein.

2. Description of the Related Art

Recently, laptop type computers are popular which have a keyboard and a flat panel type display unit mounted to a base unit having a rectangular box shape.

Of portable computers of this type, the one having a display unit with a liquid crystal display (LCD) detachably connected to a base unit is disclosed in U.S. Pat. No, 4,749,364. According to the computer with the detachable display unit, when an image with a high resolution is desired, an operator detaches the display unit from the base unit and connects a CRT display unit to the base unit by a cable.

with this portable computer in use, to connect the display unit detachably, a socket having a first connector is provided to the base unit. The display unit has an engage leg having a second connector in association with this socket. Plugging the engage leg into the socket connects the connectors together to thereby mechanically and electrically couple the base unit and display unit.

The display unit uses a battery on the base unit side as its driving power supply. In a case where an LCD with a back light or plasma display is employed in the display unit, burning on the back light or generating a plasma discharge requires a voltage converter to convert the reference voltage of the battery into a high voltage. When this voltage converter is located on the base unit side, the first connector in the socket receives a high voltage through the voltage converter. The first connector, which is applied with the high voltage, is exposed in the socket when the display unit is detached from the socket. The operator, when accidentally touching the first connector, probably receives an electric shock.

According to computers with a detachable display unit, it is desired that the voltage converter be attached to the display unit side as disclosed in U.S. patent application Ser. No. 07/406,614 filed Sep. 12, 1989 by Takashi Hosoi.

The voltage converter includes circuit parts, such as a transformer and resistors, which generate heat themselves while being energized. Accommodating the voltage converter in the housing of the display unit therefore raises the following problem.

When using the computer, the operator sets the display unit upright for easier view of the LCD. If the voltage converter is located below the LCD when the display unit stands upright, heat generated by circuit parts rises due to the convection in the housing and is locally transmitted to the LCD. This produces color spots on the display screen due to the temperature difference, making it difficult to see an image.

SUMMARY OF THE INVENTION

It is an object of the present invention to provide a portable apparatus which hinders heat generated by a circuit parts from being transmitted to display means, thus ensuring display of an image with a high resolution.

To achieve the object, according to the present invention, there is provided a portable apparatus comprising:

a base unit having power supply means for generating a reference voltage;

a display unit supported rotatable to the base unit, having flat panel display and a housing for containing the flat panel display, the housing being rotated to an open position for operating the apparatus; and means, electrically connected to the power supply means, for converting a reference voltage of the power supply means into a drive voltage for driving the flat panel display, the converting means being located on the right or left of the flat panel display rotated to the open position or thereabove in the housing.

According to the portable apparatus of this invention, when the display unit is set upright, the converting means is not located below the flat panel display. Therefore, the flat panel display is prevented from being directly exposed to heat from the converting means that rises in the housing to thereby reduce the heat influence on the flat panel display, irrespective of the flat panel display and the converting means being located in the same housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 3:
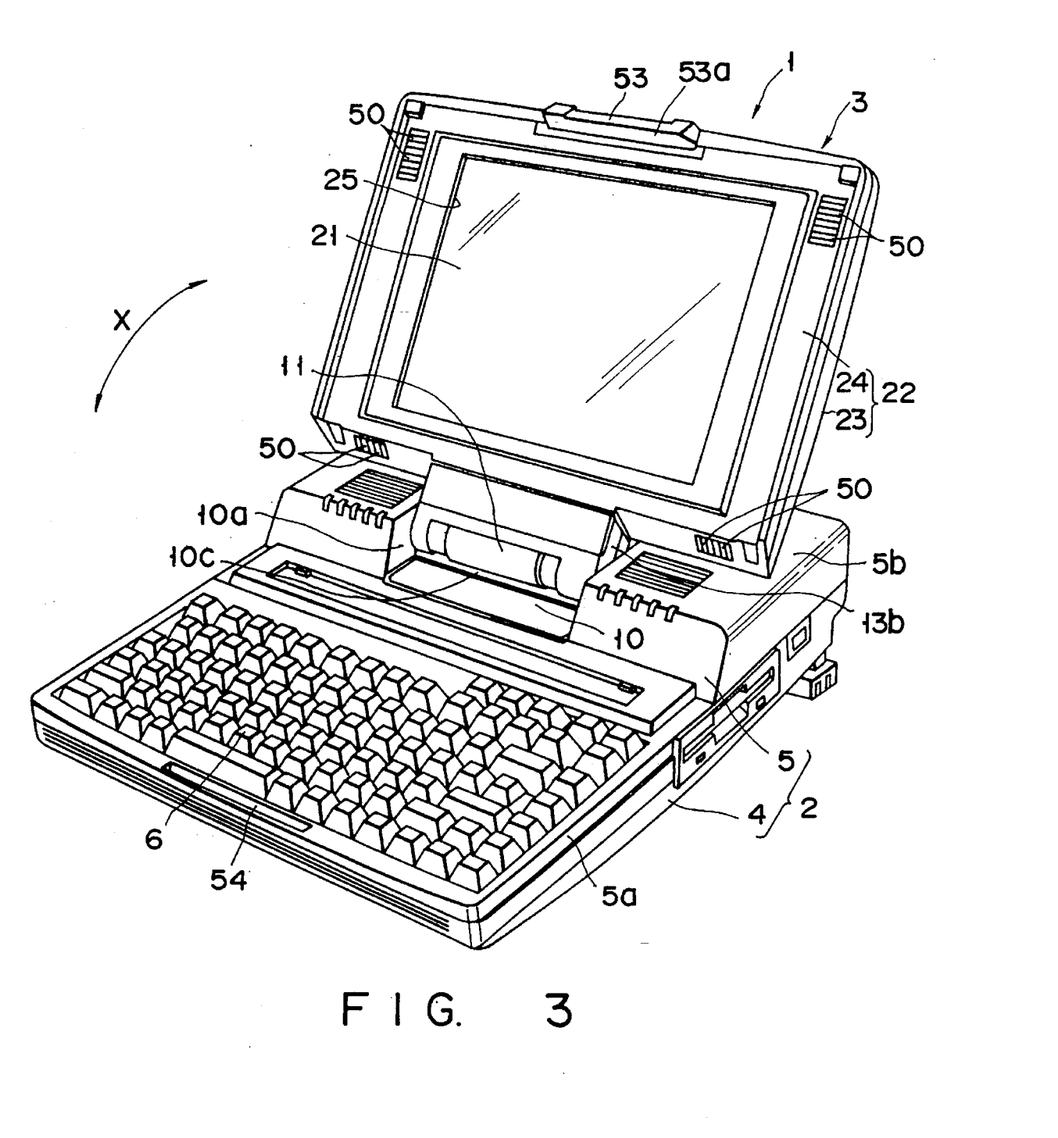
FIG. 3 is a perspective view illustrating the display unit of the portable computer in an upright state.
Figure 8:
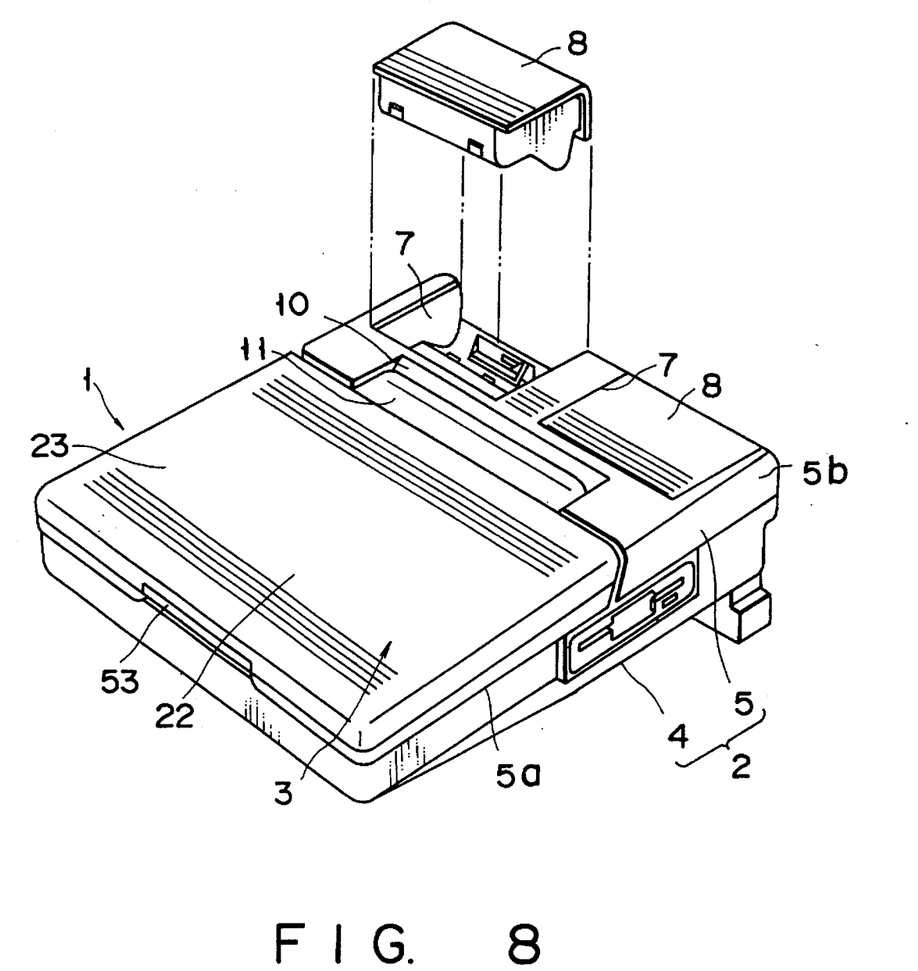
FIG. 8 is a perspective view showing the display unit of the portable computer in a closed state.

FIG. 3 illustrates a laptop type portable computer 1. The computer 1 has a base unit 2 and a flat panel type display unit 3. The base unit 2, which is shaped like a thin rectangular box, comprises a bottom case 4 and a top cover 5 that covers the top of the bottom case 4. The top cover 5 has a front portion 5a attached with a keyboard 6. A rear portion 5b of the top cover 5 is thicker than the front portion 5a. As shown in FIG. 8, a pair of battery receiving recesses 7 are provided side by side at the back of the rear portion 5b. A battery 8 as a driving power supply for the computer 1 is detachably attached to each recess 7. The battery 8 is electrically connected to a printed circuit board (not shown) located in the base unit 2.

Figure 4:
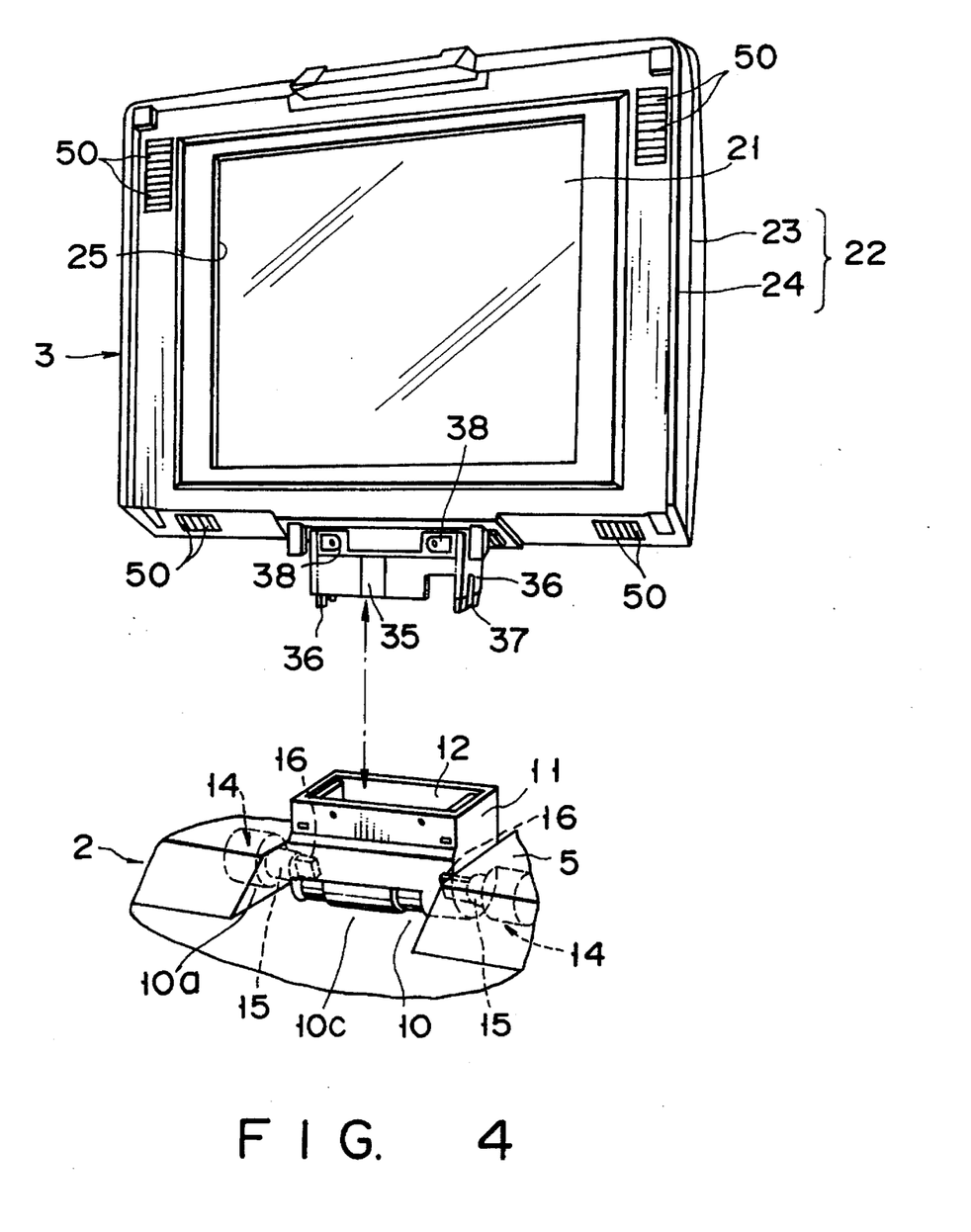
FIG. 4 is an exploded perspective view illustrating the display unit of the portable computer in FIG. 3 being detached from a base unit.
Figure 5:
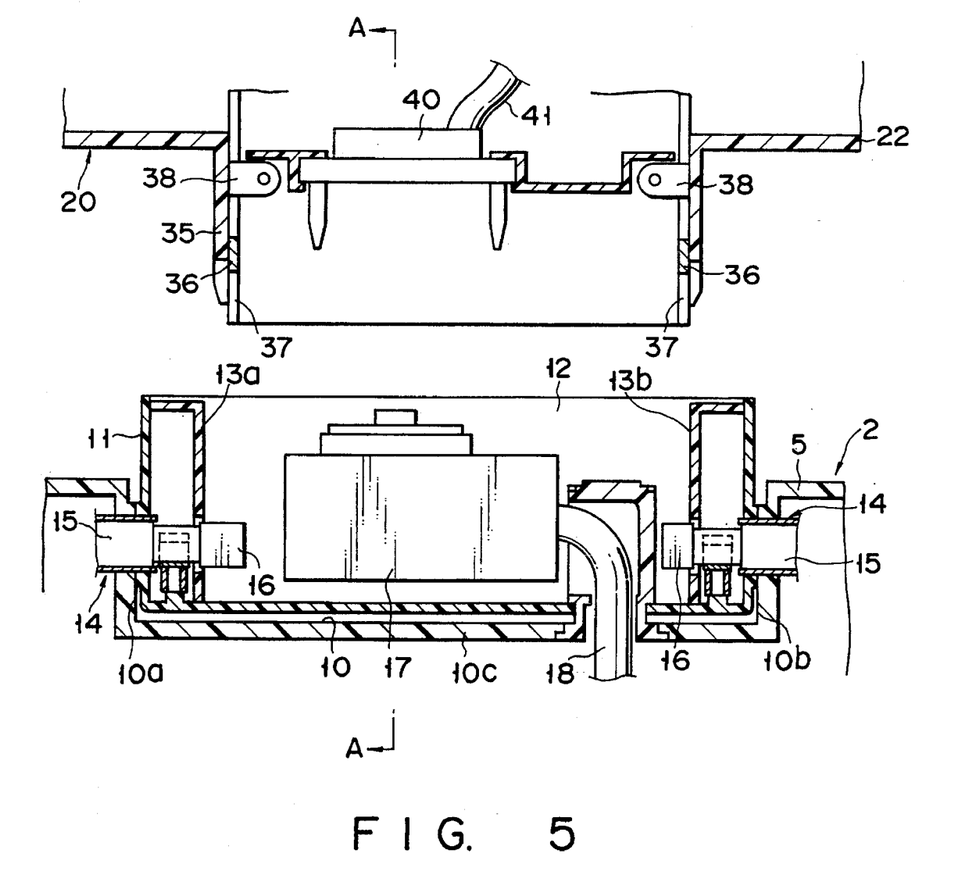
FIG. 5 is a cross sectional view illustrating a connecting portion of the display unit being detached from the base unit.
Figure 6:
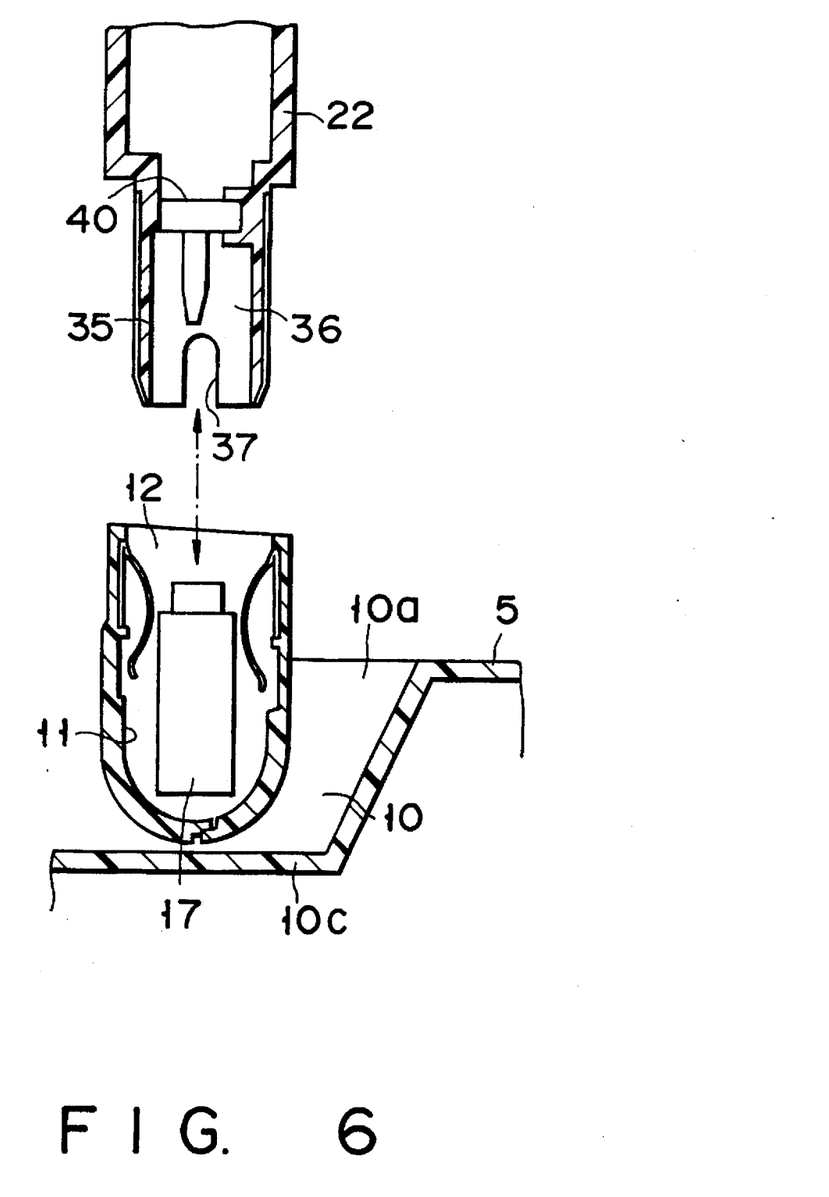
FIG. 6 is a cross sectional view taken along line A—A in FIG. 5.
Figure 7:
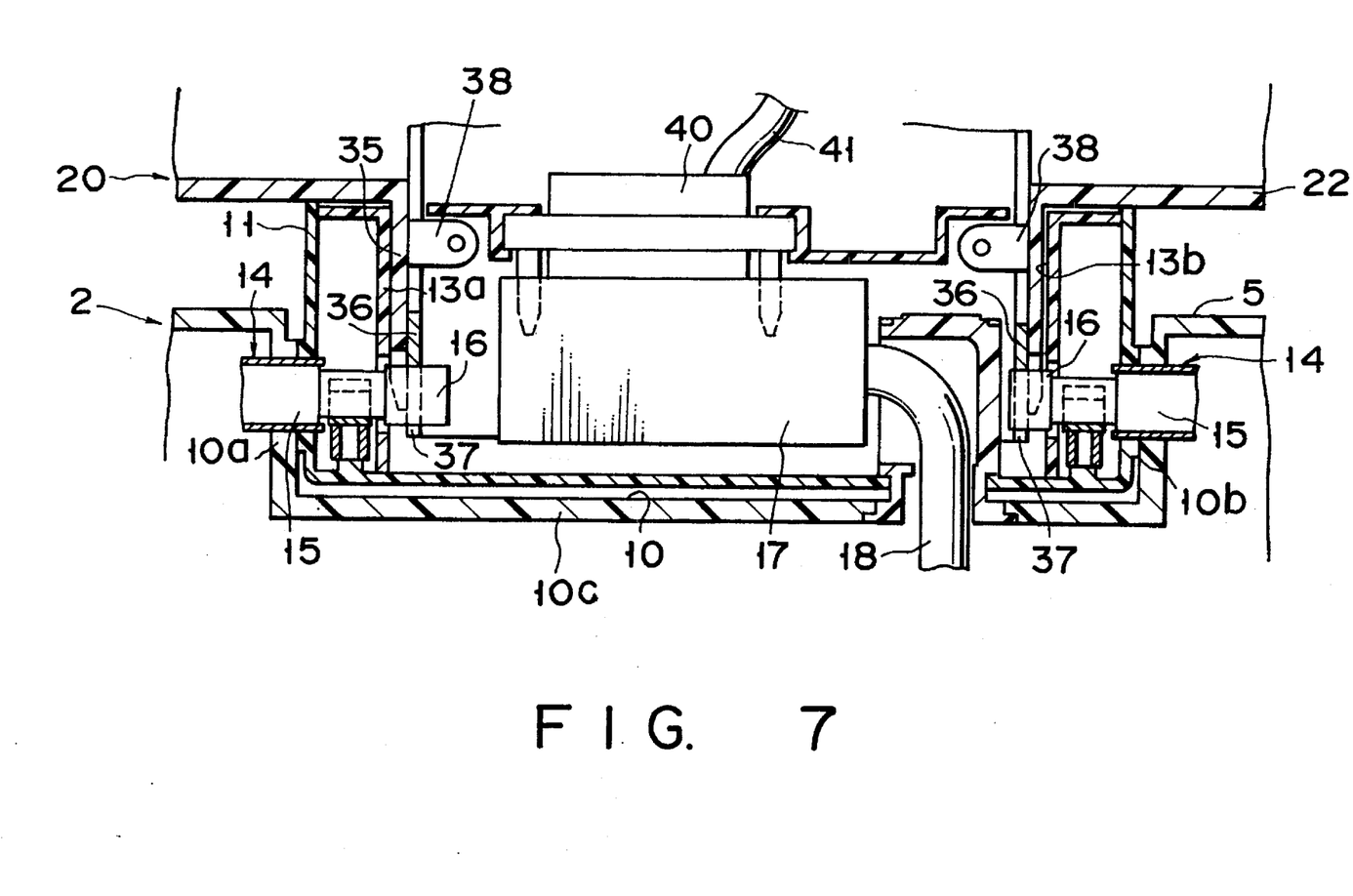
FIG. 7 is a cross sectional view illustrating a portion where the connecting portion of the display unit is coupled to a socket of the base unit.

A socket mounting recess 10 is provided at the center portion of the front end of the rear portion 5b. As shown in FIG. 4 to 6, the recess 10 has two side walls 10a and 10b and a bottom 10c extending between the side walls 10a and 10b. A box-shaped socket 11 is mounted in the recess 10. The socket 11 has an opening portion 12 for detachable connection of the display unit 3. The socket 11 also has two side portions 13a and 13b respectively facing the side walls 10a and 10b of the recess 10, and each of the side portions 13a and 13b is supported rotatable on the top cover 5 by a hinge mechanism 14. The hinge mechanism 14 is located inside the top cover 5. The hinge mechanism 14 has a hinge shaft 15 that rotates around the shaft. The hinge shaft 15 penetrates the side walls 10a and 10b of the socket mounting recess 10 and the side portions 13a and 13b of the socket 11, and is connected rotatable to the top cover 5. The free rotation of the hinge shaft 15 is suppressed by spring means (not shown). The one end of the hinge shaft 15 extends into the socket 11, and an engage piece 16 is formed at this one end of the hinge shaft 15.

A first connector 17, which is retained in the socket 11, is electrically connected to the printed circuit board in the base unit 2 by a cable 18.

Figure 1:
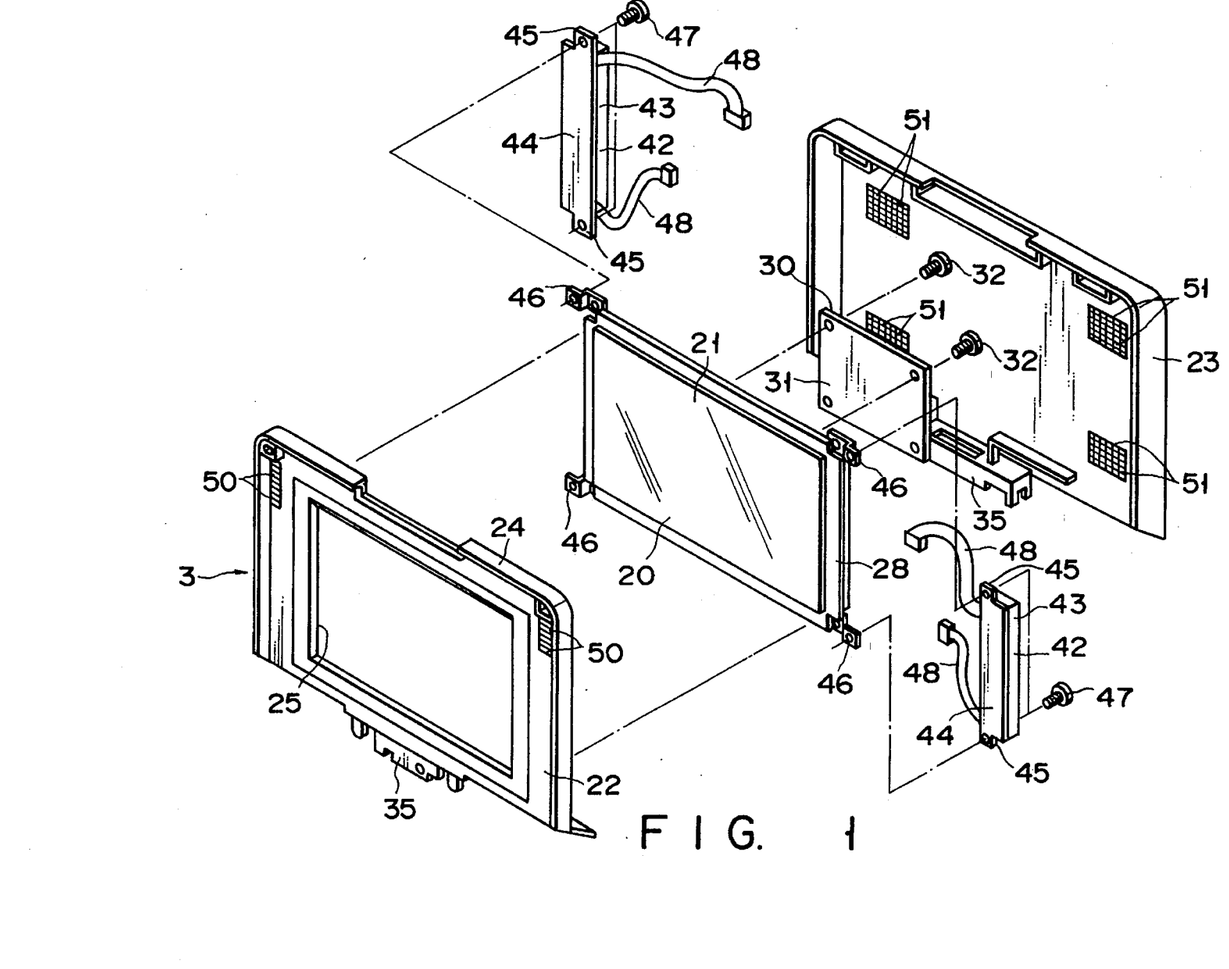
FIG. 1 is an exploded perspective view of a display unit of a portable computer according to the present invention.
Figure 2:
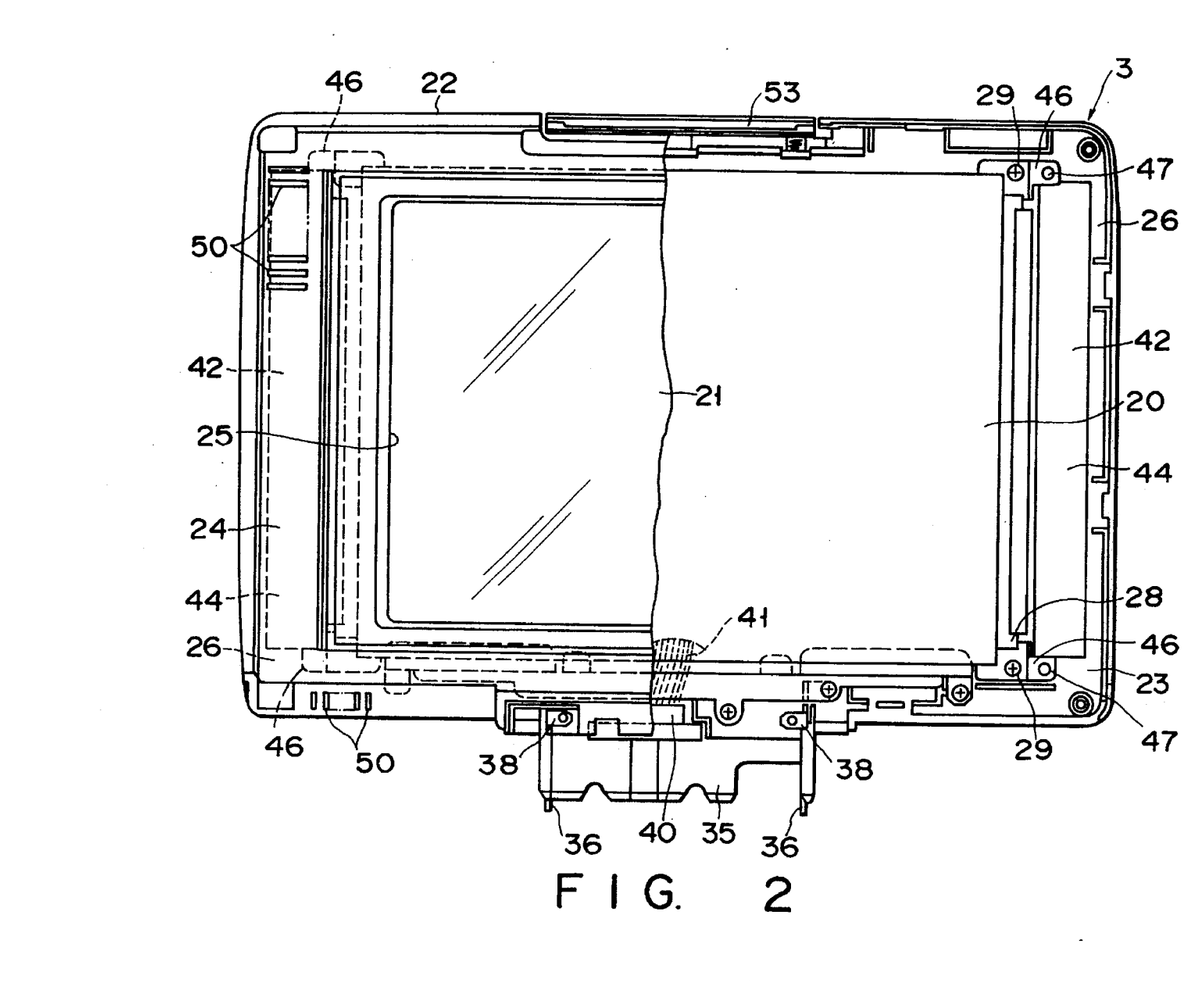
FIG. 2 is a partly cutaway front view of the display unit shown in FIG. 1.

A display unit 3 to be coupled detachable to the socket 11 has a plasma display 20 for displaying an image. The plasma display 20 includes a rectangular screen 21, and is retained in a housing 22 with a rectangular box shape. As shown in FIG. 1, the housing 22 comprises a rear panel 23 and a front panel 24 connected together. The plasma display 20 is held between both panels 23 and 24. An opening 25 for exposing the screen 21 is formed in the center portion of the front panel 24. As shown in FIG 2, this housing 22 has space 26 on either side of the opening 25.

As shown in FIG. 1, the plasma display 20 has a frame 28 made of aluminum alloy. The frame 28 has a rectangular flat shape greater than the size of the screen 21. As shown in FIG. 2, the frame 28 has four corner portions securely fastened to the inner wall of the rear panel 23 by screws 29. A drive circuit portion 30 for driving the plasma display 20 is located between the frame 28 and rear panel 23. This drive circuit portion 30 includes various circuit parts, such as IC and connectors, which are mounted on a printed circuit board 31. The printed circuit board 31 is securely fastened through screws 32 to the frame 28.

As shown in FIG. 4, the housing 22 of the display unit 3 has a connecting portion 35 which is connected detachable to the socket 11. The connecting portion 35 is positioned at the lower center portion of the housing 22 and has a box shape fittable in the socket 11. A metal engaging leg 36 is provided on either side of the connection portion 35. As shown in FIG. 6, an engage groove 37 is formed in the end of the engaging leg 36. The engage groove 37 engages with the engage piece 16 of the hinge shaft 15 when the connecting portion 35 of the housing 22 is fitted in the socket 11. This engagement permits the display unit 3 to rotate together with the hinge shaft 15 therearound. Accordingly, the display unit 3 is rotated between the close position where the keyboard 6 is covered and the open position where the keyboard 6 is exposed when displaying an image and the screen 21 can be visually confirmed, as indicated by the arrow X in FIG. 3.

The engaging leg 36 is provided with a tongue 38 protruding from the front of the connecting portion 35. A screw (not shown) which penetrates the front of the socket 11 is screwed into the tongue 38, and this screw prevents the connecting portion 35 from coming off of the socket 11. A second connector 40 is retained inside the connecting portion 35. The second connector 40 is electrically connected to the drive circuit portion 30 through a cable 41. Plugging the connecting portion 35 of the housing 22 into the socket 11 electrically connects the second connector 40 to the first connector 17. This electric connection permits the display unit 3 to be electrically connected to the base unit 2.

The display unit 3 includes a voltage converter 42 which is electrically connected by a cable 48 to the drive circuit portion 30 and the second connector 40. The voltage converter 42 is supplied with a reference voltage Vl of the battery 8 through the first and second connectors 17 and 40. The voltage converter 42 converts the received reference voltage Vl into a drive voltage v2 for driving the plasma display 20. The drive circuit portion 30 of the plasma display 20 is driven by the drive voltage V2.

This voltage converter 42 is located together with the plasma display 20 in the housing 22 of the display unit 3. The voltage converter 42 includes circuit parts 43, such as a capacitor or a transformer, which self-generate heat during the converting operation. As shown in FIGS. 1 and 2, the circuit parts 43 are separated into two portions which are respectively mounted on a pair of printed circuit boards 44. The printed circuit boards 44 have an elongated shape to be consistent with both side portions of the frame 28 of the plasma display 20. Tongues 45 are provided at the respective lengthwise end portions of the printed circuit board 44. The tongues 45 are securely fastened by means of screws 47 to brackets 46 of the corner portions of the frame 28. The securing of the tongues 45 in this manner sets the circuit parts 43, which self-generate heat, on both sides of the plasma display 20, and retained in the spaces 26 in the housing 22.

Air holes 50 of a louver shape open to the spaces 26 in the housing 22 are formed at four sections of the front panel 24 of the housing 22. With the display unit 3 rotated to the open position, the air holes 50 are located on both right and left sides of the upper front portion of the front panel 24 and on right and left sides of the bottom of the front panel 24. When the display unit 3 stands upright, therefore, the individual air holes 50 respectively face the upper and lower ends of the printed circuit board 44 that support the circuit parts 43. Other air holes 51 open to the interior of the housing 22 are also formed in the rear panel 23 of the housing 22. The air holes 51 are located at four corners of the rear panel 23, communicating with the spaces 26 in the housing 22. Like the air holes 50, therefore, the air holes 51 respectively face the upper and lower ends of the printed circuit board 44 that support the circuit parts 43 when the display unit 3 is at the open position.

When the circuit parts 43 of the voltage converter 42 generates heat during the use of the computer 1, the temperature in the housing 22 rises, causing a convection in the housing 22. As a result, the outside air flows into the spaces 26 in the housing 22 through the air holes 50 and 51 formed in the lower portions of the front panel 24 and the rear panel 23. The outside air rises in the spaces 26 in the housing 22 by the convection, and contacts the printed circuit board 44 and the circuit parts 43 to cool them in the course of the rising action. Having cooled the circuit parts 43 and printed circuit board 44, the outside air is discharged outside of the housing 22 through the air holes 50 and 51 at the upper portions of the front panel 24 and rear panel 23. Accordingly, the air permeability in the spaces 26 in the housing 22 is improved, preventing the heat of the circuit parts 43 from remaining in the housing 22. The housing 22 of the display unit 3 is provided with a latch piece 53 for holding the display unit 3 at the close position. This latch piece 53 extends from the front of the front panel 24 of the housing 20. With the display unit 3 closed at the close position, the extending portion 53a of the latch piece 53 engages with an engage recess 54 at the front of the bottom case 4 to thereby hold the display unit 3 at the close position.

According to the portable computer 1 with the above arrangement, the voltage converter 42, which self-generates heat during the converting action, is arranged on the right and left of the plasma display 20 in the housing 22 of the display unit 3. Even with the display unit 3 rotated to the open position for image display, therefore, the voltage converter 42 does not come under the plasma display 20. Therefore, the heat generated from the voltage converter 42 does not rise in the spaces 26 in the housing 22 in such a way as to surround the plasma display 20. As a result, the heat influence on the plasma display 20 is reduced even though the plasma display 20 and the voltage converter 42 are located in the same housing 22.

Further, while the computer 1 is in use, the heat generated by the circuit parts 43 escapes out of the housing 22 through the air holes 50 and 51 of the rear panel 23 and front panel 24, thus preventing the temperature in the housing 22 from locally increasing.

The difference in temperature at the individual sections of the plasma display 20 gets smaller, permitting an image with fewer color spots and higher resolution to be displayed.

Figure 9:
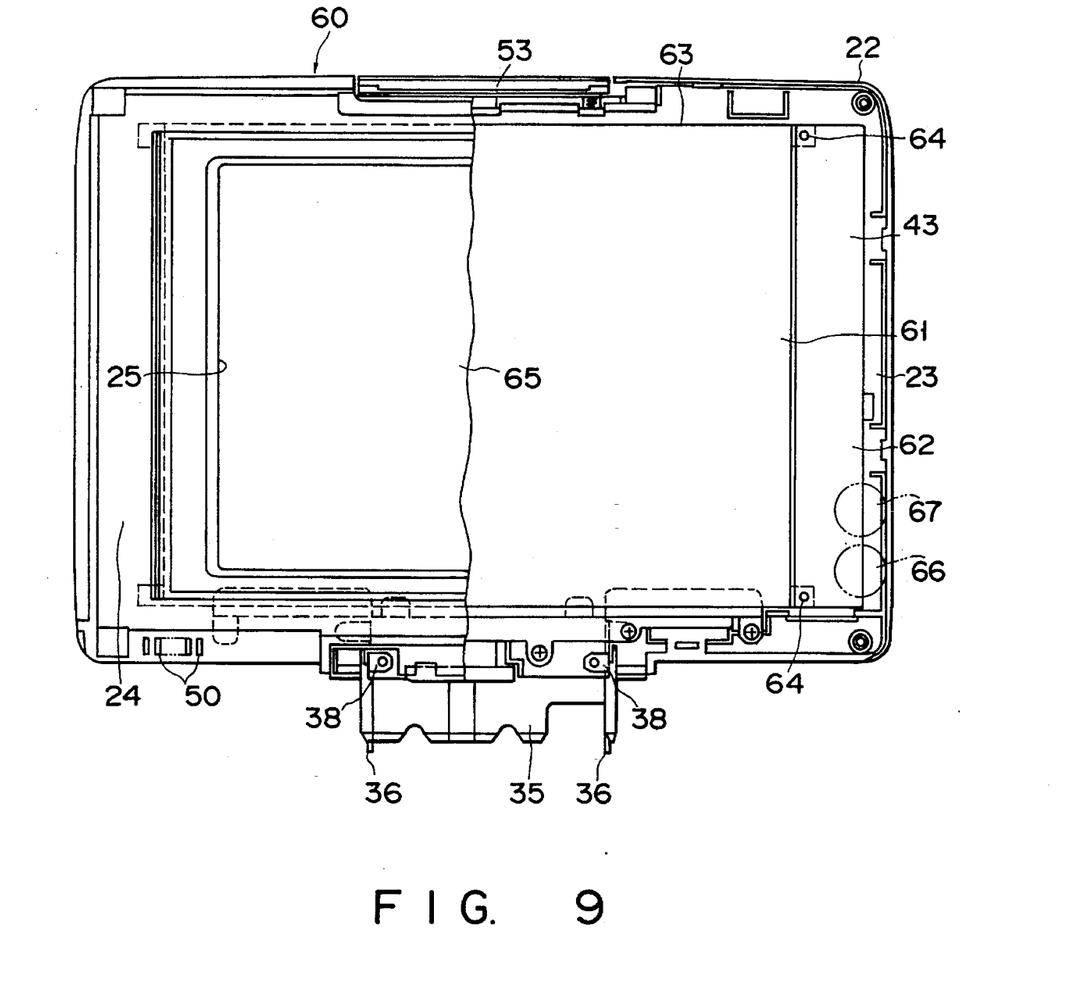
FIG. 9 is a partly cutaway front view illustrating a display unit according to the second embodiment of the present invention.

FIG. 9 illustrates the second embodiment of the present invention. The second embodiment differs from the first embodiment in that a display unit 60 employs a back-light type liquid crystal display 61 in place of the plasma display 20. As disclosed in U.S. Pat. application Ser. No. 07/514,027 filed Apr, 27, 1990 by Seiichi Furuya, the voltage converter 42 of the display unit 60 using the liquid crystal display 61 converts the reference voltage V1 of the battery 8 into a drive voltage V3 for driving the back-light device. The drive circuit portion of the liquid crystal display 61 is driven by the reference voltage V1 of the battery 8.

The circuit parts 43 constituting the voltage converter 42 is mounted on a single elongated printed circuit board 62, which is located along the right side of the liquid crystal display 61. The printed circuit board 62 is securely fastened to a frame 63 of the display 61 by means of screws 64.

The display unit 60 is provided with a dial 66 for controlling the display density of a display screen 65 and a dial 67 for controlling the brightness of the display screen 65.

Figure 10:
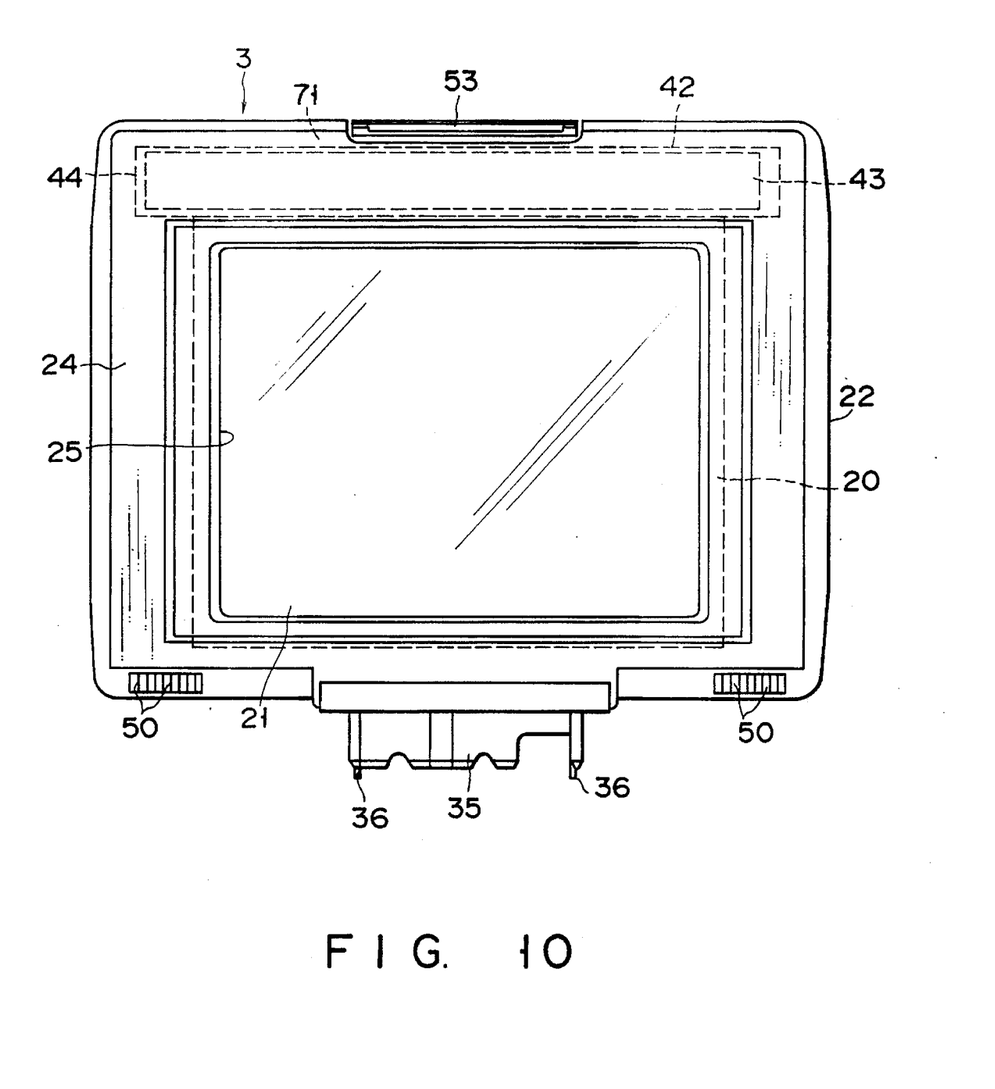
FIG. 10 is a front view showing a display unit according to the third embodiment of the present invention.

FIG. 10 illustrates the third embodiment of the present invention. The third embodiment differs from the first embodiment in that the housing 22 rotated to the open position has a space 71 above the opening 25, with the voltage converter 42 arranged in this space 71. The fundamental structure and action, except the location of the voltage converter 42, are the same as those of the first embodiment.

The portable apparatus according to the present invention should not necessarily be restricted to a laptop type portable computer, but the present invention may be applied to a word processor or a liquid crystal television as well.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A portable apparatus comprising:

a base unit having power supply means for generating a reference voltage;

a display unit rotatably supported on the base unit, said display unit provided with a flat panel display having right and left sides substantially parallel to each other and separated by a bottom side, the bottom side being more proximate to the base unit than the right and left sides are proximate to the base unit, a rigid frame located behind said flat panel display, said rigid frame having a rectangular shape which is larger in size than the flat panel display, the rigid frame having at least a first side extending substantially a length of and being substantially parallel to said bottom side, the rigid frame having at least a second side connected to said first side extending substantially a length of and being substantially parallel to said right and left sides, the rigid frame having a plurality of brackets connected to said second side, said brackets extending from the second side in a direction lateral to the rigid frame, and a housing for containing said flat panel display and said rigid frame attached thereto, the housing including a rear panel and a front panel attached to the rear panel, the front panel having an opening for exposing the flat panel display, said housing being rotatable between a closed position and an open position permitting viewing of said flat panel display; and converting means, electrically connected to said power supply means, for converting a reference voltage of said power supply means into a drive voltage for driving said flat panel display, said converting means being fixed to the brackets of the rigid frame and arranged in line with at least one of the right and left sides of the flat panel display without being placed on top of the flat Panel display.

2. The portable apparatus according to claim 1, wherein said flat panel display of said display unit is a plasma display.

3. The portable apparatus according to claim 1, wherein said flat panel display of said display unit has a transmission type liquid crystal display and back-light device.

4. The portable apparatus according to claim 1, wherein said housing of said display unit has spaces on either side of said opening for retaining said converting means.

5. The portable apparatus according to claim 4, wherein said flat panel display and converting means are held between said front and rear panels.

6. The portable apparatus according to claim 5, wherein said converting means includes a pair of elongated printed circuit boards, and wherein air holes respectively communicating with said spaces in said housing are formed in said front and rear panels of said housing at positions corresponding to said printed circuit boards.

7. The portable apparatus according to claim 6, wherein said air holes face upper and lower end portions of said printed circuit boards when said display unit is rotated to said open position.

8. The portable apparatus according to claim 1, wherein said power supply means is a battery detachably mounted to said base unit.

9. The portable apparatus according to claim 1, wherein said base unit has a keyboard at a front portion, and said display unit is rotatable to any position between a close position for covering said keyboard and said open position.

10. The portable apparatus according to claim 1, wherein said frame is made of aluminum and has a flat plate shape.

11. A portable apparatus comprising:
a base unit having power supply means for generating a reference voltage;
a socket supported pivotable to said base unit by hinge means;
a display unit containing a connection portion detachably connected to said socket, said display unit provided with a display device having right and left sides substantially parallel to each other and separated by a bottom side, the bottom side being more proximate to the base unit than the right and left sides are proximate to the base unit, a rigid frame located behind said display device, said rigid frame having a rectangular shape which is larger in size than the display device, the rigid frame having at least a first side extending substantially a length of and being substantially parallel to said bottom side, the rigid frame having at least a second side connected to said first side extending substantially a length of and being substantially parallel to said right and left sides, the rigid frame having a plurality of brackets connected to the second side, said brackets extending from said second side in right and left directions of the rigid frame, a housing surrounding said display device, and said rigid frame attached to said housing, said housing being rotatable between a closed position and an open position to permit viewing of said display unit, the housing including a rear panel and a front panel attached to the rear panel, the front panel having an opening for exposing the display device; and
converting means, electrically connected to said power supply means, for converting a reference voltage of said power supply means into a drive voltage for driving said display device, said converting means being fixed to the brackets and arranged in line with at least one of the right and left sides of said display device without being placed on top of the display device.

12. The portable apparatus according to claim 11, wherein said socket has a first connector electrically connected to said power supply means, said connecting portion of said display unit has a second connector electrically connected to said converting means and said display device, and said first and second connectors are electrically connected together when said connecting portion is coupled to said socket.

13. The portable apparatus according to claim 11, wherein said base unit has a keyboard at a front portion and a socket-mounting recess formed at a rear portion, for receiving said socket.

14. A portable apparatus comprising:
a base unit having a power supply generating a reference voltage, and an upper surface;
a display housing connected to the upper surface of the base unit, the display housing including an inner surface having a middle portion, a side portion connected to the middle portion, a rear panel, and a front panel attached to the rear panel, the front panel having an opening; and
a display module including a rigid frame secured to the middle portion, the rigid frame having at least two non-parallel sides joined together at a corner, said rigid frame having plurality of brackets extending in a direction of the side portion, a flat panel display secured to the frame and disposed on the middle portion and being exposed by the opening of the front panel, and a voltage increase circuit increasing a reference voltage to a drive voltage for driving the flat panel display, said voltage increase circuit being fixed to the brackets and arranged at the side portion, said voltage increase circuit being arranged in a direction lateral to said flat panel display without being placed on top of the flat panel display.

15. A portable apparatus comprising:
a base unit having power supply means for generating a reference voltage;
a display unit supported rotatable to the base unit, including a flat panel display having right and left sides substantially parallel to each other and separated by a bottom side, the bottom side being more proximate to the base unit than the right and left sides are proximate to the base unit, a rigid frame located behind said flat panel display, said rigid frame having a rectangular shape which is larger in size than the flat panel display, the rigid frame having at least a first side extending substantially a length of and being substantially parallel to said bottom side, the rigid frame having a pair of second sides connected to said first side extending substantially a length of and being substantially parallel to said right and left sides, the rigid frame having a plurality of brackets connected to the second sides, the brackets extending from said second sides in right and left directions of the rigid frame, and a housing surrounding said flat panel display and said rigid frame attached thereto, said housing being rotatable between a closed position and an open position permitting viewing of said flat panel display; and
converting means, electrically connected to said power supply means, for converting a reference voltage of said power supply means into a drive voltage for driving said flat panel display, said converting means including a pair of long and narrow printed circuit boards, each of said printed circuit boards having a number of tongues, said tongues being fixed to the brackets through a plurality of screws to thereby allow arranging the printed circuit boards in line with the right and left sides of said flat panel display without placing the printed circuit boards on top of the flat panel display.

* * * * *